US007797277B2

(12) United States Patent
Suzuki

(10) Patent No.: US 7,797,277 B2
(45) Date of Patent: Sep. 14, 2010

(54) DOCUMENT MANAGEMENT SYSTEM, PROGRAM, AND COMPUTER DATA SIGNAL

(75) Inventor: Akira Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 184 days.

(21) Appl. No.: 11/559,072

(22) Filed: Nov. 13, 2006

(65) Prior Publication Data

US 2007/0233670 A1    Oct. 4, 2007

(30) Foreign Application Priority Data

Apr. 3, 2006    (JP)    ............................. 2006-101365

(51) Int. Cl.
*G06F 7/00*    (2006.01)
(52) U.S. Cl. ....................... 707/638; 707/641; 707/649; 707/690; 707/721
(58) Field of Classification Search ..................... 707/3, 707/200, 9, 10, 638, 641, 649, 690, 721; 709/206, 207, 225; 358/1.1; 715/234
See application file for complete search history.

(56) References Cited

U.S. PATENT DOCUMENTS

| 5,897,643 | A * | 4/1999 | Matsumoto ................. 715/234 |
| 2003/0041112 | A1 * | 2/2003 | Tada et al. .................. 709/206 |
| 2003/0154071 | A1 * | 8/2003 | Shreve .......................... 704/9 |
| 2005/0192949 | A1 * | 9/2005 | Kojima .......................... 707/3 |
| 2006/0282504 | A1 * | 12/2006 | Yoshioka et al. ............. 709/207 |
| 2006/0294152 | A1 * | 12/2006 | Kawabe et al. .............. 707/200 |
| 2007/0206205 | A1 * | 9/2007 | Suzuki ........................ 358/1.1 |
| 2007/0299969 | A1 * | 12/2007 | Kunitake et al. ............. 709/225 |
| 2008/0256045 | A1 * | 10/2008 | Teng et al. ..................... 707/3 |
| 2008/0263104 | A1 * | 10/2008 | Chowdhary et al. ......... 707/200 |
| 2009/0198597 | A1 * | 8/2009 | Osterer ........................ 705/28 |
| 2009/0300042 | A1 * | 12/2009 | Lloyd et al. ................. 707/101 |

FOREIGN PATENT DOCUMENTS

| JP | 2297288 | 12/1990 |
| JP | 6077994 | 3/1994 |
| JP | 2001125841 | 5/2001 |

OTHER PUBLICATIONS

Luis Romero et al., "HyperReal: A hypermedia model for mixed reality", ACM, Aug. 2003, pp. 2-9.*
Raghav Kaushik et al., "Updates for Structure Indexes", ACM, 2002, pp. 1-12.*

* cited by examiner

*Primary Examiner*—Thuy N Pardo
(74) *Attorney, Agent, or Firm*—Gauthier & Connors LLP

(57) ABSTRACT

A document management system acquires a document which is associated to a document ID specified by an access request; generates a new document ID which is associated with the acquired document; and outputs the acquired document and the new document ID to a request origin. The document management system registers associative information on the request origin, the new document ID, and the document ID specified by the access request; generates a new document ID which is associated with a document corresponding to a transferred document ID; replaces the transferred document ID with the new document ID, to cause the new document ID to be transferred to a transfer destination; and registers associative information on a transfer source, the new document ID after replacement, the document ID before replacement, and the transfer destination.

7 Claims, 4 Drawing Sheets

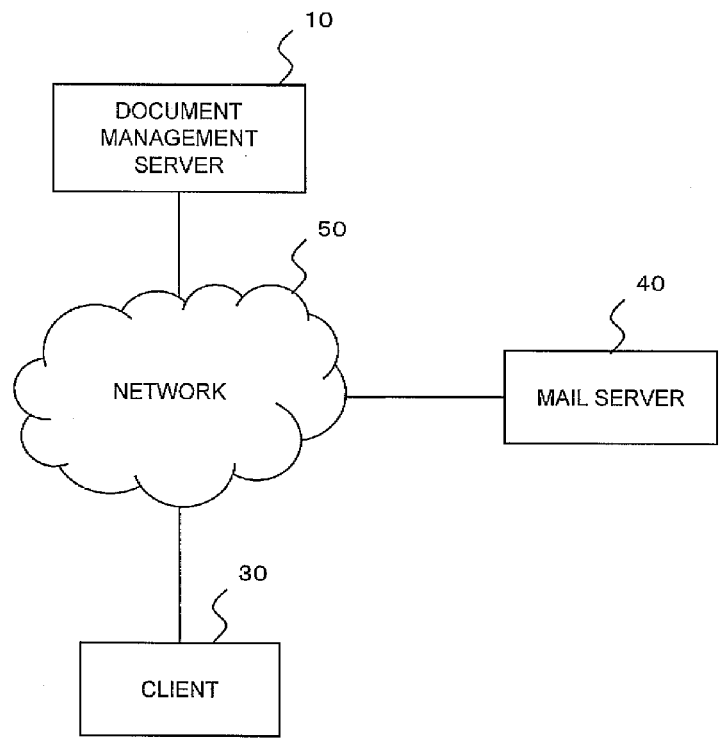
Fig. 1
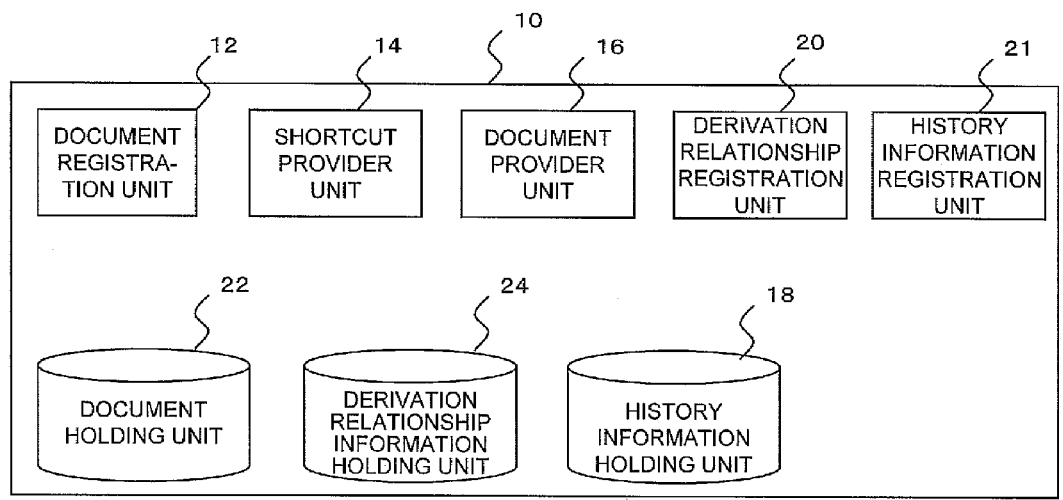
Fig. 2
[id=1234567, host=foo.fujixerox.co.jp,createDate=2005/05/24 11:12:34]
102 104 106
Fig. 3

| EVENT | REQUEST ORIGIN | DESTINATION | NEW ID | OLD ID | DATE |
|---|---|---|---|---|---|
| DOCUMENT REGISTRATION | USER A | — | 0 | — | 2005/6/1 9:58:05 |
| SC GENERATION | USER A | — | 1-1 | 0 | 2005/6/2 9:58:06 |
| DUPLICATE READ | USER A | — | 2-1 | 1-1 | 2005/6/2 10:12:30 |
| DUPLICATE READ | USER B | — | 3-1 | 2-1 | 2005/6/5 11:17:44 |
| DUPLICATE READ | USER C | — | 3-2 | 2-1 | 2005/6/6 11:18:45 |

110   112   114   116   118   120

| | EVENT | REQUEST ORIGIN | DESTINATION | NEW ID | OLD ID | DATE |
|---|---|---|---|---|---|---|
| | DOCUMENT REGISTRATION | USER A | – | 0 | – | 2005/6/1 9:58:05 |
| | SC GENERATION | USER A | – | 1-1 | 0 | 2005/6/2 9:58:06 |
| | DUPLICATE READ | USER A | – | 2-1 | 1-1 | 2005/6/2 10:12:30 |
| 130 | SC TRANSMISSION | USER A | USER B | 3-1 | 2-1 | 2005/6/2 11:10:42 |
| 131 | SC TRANSMISSION | USER B | USER C | 4-1 | 3-1 | 2005/6/3 11:15:42 |
| | DUPLICATE READ | USER B | – | 4-2 | 3-1 | 2005/6/5 11:17:44 |
| 132 | DUPLICATE READ | USER C | – | 5-1 | 4-1 | 2005/6/6 11:18:45 |

# DOCUMENT MANAGEMENT SYSTEM, PROGRAM, AND COMPUTER DATA SIGNAL

PRIORITY INFORMATION

This application claims priority from Japanese Patent Application No. 2006-101365, filed on Apr. 3, 2006.

BACKGROUND

1. Technical Field

The present invention relates to document management technology for managing digital documents and providing digital documents requested from users.

2. Related Art

Techniques are known for managing the transmission history of documents attached to electronic mail by document servers or mail servers.

SUMMARY

A document management system relating to the present invention includes a document provider unit that acquires, in response to an access request, a document which is associated to a document ID specified by the access request, from a document storage holding a document which is associated to at least one document ID, generates a new document ID which is associated with the acquired document, and outputs the acquired document and the new document ID to a request origin, a history information registration unit that registers associative information on the request origin, the new document ID, and the document ID specified by the access request, a document ID replacement unit that generates, corresponding to transferring of a document ID by a transfer source, a new document ID which is associated with a document corresponding to the transferred document ID and replaces the transferred document ID with the new document ID, to cause the new document ID to be transferred to a transfer destination, and a notification unit that causes the history information registration unit to register associative information on the transfer source, the new document ID after replacement, the document ID before replacement, and the transfer destination.

BRIEF DESCRIPTION OF THE DRAWINGS

Exemplary embodiments of the present invention will be described in detail based on the following figures, wherein:

FIG. 1 shows an overall configuration of a document management system relating to an exemplary embodiment;

FIG. 2 shows a functional block diagram of the document management server;

FIG. 3 shows one example of data included in a duplicate sc;

DETAILED DESCRIPTION

Figures 4, 5:
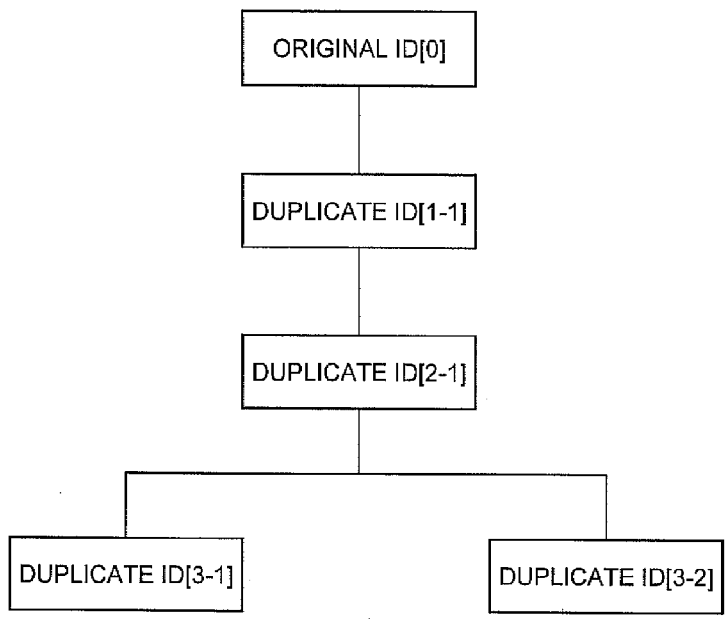
FIG. 4 shows one example of a derivation relationship indicated in the derivation relationship information.
FIG. 5 shows one example of history information managed by a history information management unit.

Best modes (referred to as embodiments) for embodying the present invention will be described hereinafter with reference to the attached drawings.

FIG. 1 shows an overall configuration of a document management system relating to an exemplary embodiment. As shown in FIG. 1, the system includes a document management server 10, a client 30, and a mail server 40 connected to a network 50, such as a LAN (Local Area Network) or the Internet.

The document management server 10 manages document originals. Furthermore, the document management server 10 provides to the client 30 files (hereinafter referred to as duplicate shortcuts) that include reference information required to read the documents. The duplicate shortcuts do not include the document bodies. It should be noted that documents represent data in general that can be distributed over the network 50, such as text files, image files, audio files, video files, and so forth.

When the client 30 opens a duplicate shortcut, the document management server 10 is accessed on the basis of reference information that is included in the duplicate shortcut and the body of a document is acquired. The reference information will be described later. The body of the document acquired by the client 30 is processed only in the work memory used by an application for reading documents and not stored as a file onto disk at the client 30. Thus, the client 30 must access the document management server 10 when acquiring a document corresponding to the duplicate shortcut in response to a document read request from a user. As a result, the document management server 10 can manage history information relating to accesses to documents that are managed by the document management server 10 itself.

The mail server 40 relays electronic mail that the client 30 transmits and receives.

FIG. 2 shows a functional block diagram of the document management server 10. In FIG. 2, a document registration unit 12 executes a document registration process. More specifically, the document registration unit 12 receives a document registration request from the client 30, combines the document that included in the document registration request with an attribute of the document, and registers the combination as an original into a document holding unit 22. When registering an original, the document registration unit 12 generates an original ID that uniquely identifies the original, associates the original with the original ID and registers the original into the document holding unit 22. Furthermore, the document registration unit 12 notifies a derivation relationship registration unit 20 of the generated original ID. The derivation relationship registration unit 20 receives this notification and registers the original ID into the derivation relationship information that is held by a derivation relationship information holding unit 24. The derivation relationship information will be described later. Here, the document attributes represent, for example, the file name of the document, the user name that created the document, the creation date and time of the document, and so forth. Furthermore, the document registration unit 12 notifies a history information registration unit 21 of commands for associating the user ID indicating the origin of the document registration request with the original ID that was generated in response to the document registration request and adding this association to the history information held by the history information holding unit 18. The history information registration unit 21 receives this notification, associates the user ID indicating the origin of the document registration request and the original ID that was generated in response to the document registration request, and registers this association into the history information. The history information will be described later.

The original ID preferably is a character string having rules that are difficult to guess or uses random numbers generated on the basis of a known random number generating algorithm. Furthermore, the original ID may employ a hash value of a sufficiently large data size calculated with respect to characteristic data of the original. The calculation of the hash value may employ a known message digest algorithm, such as the SHA-256 algorithm. Examples of characteristic data of the original include the content of the document or an attribute of the document. Furthermore, an XML document that has been described with a hash value of the content of the document and a hash value of an attribute of the document may be used as the characteristic data of the original. Furthermore, the XML document may be described by adding a random number.

A shortcut provider unit 14 executes a duplicate shortcut issuance process. More specifically, when the shortcut provider unit 14 receives a duplicate shortcut request from the client 30, a duplicate shortcut corresponding to a duplicate ID or an original ID included in the duplicate shortcut request is issued and the duplicate shortcut is provided to the client 30. The duplicate shortcut includes reference information, which includes the duplicate ID that has been associated with the original ID of the document to be read and access destination information indicating a request URL (Uniform Resource Locator) when a document is read or the host name of the document management server 10, and an attribute of the duplicate shortcut. The duplicate shortcut may have the PDF (Portable Document Format) file format.

The client 30 can acquire a duplicate including a copy of the document to be read by transmitting a document read request including the duplicate ID toward the request URL that is indicated when referencing the reference information that is included in the duplicate shortcut.

The duplicate ID is a value that does not conflict with the already generated original ID or another duplicate ID and like the original ID may be a hash value with respect to an attribute of the duplicate or a random number. Examples of attributes of the duplicate include, for example, the original ID that is included in the duplicate shortcut request, the received time of the duplicate shortcut request, the user ID of the client 30 of the duplicate shortcut request origin, and so forth. FIG. 3 shows one example of data included in a duplicate shortcut. For the data included in the duplicate shortcut, FIG. 3 shows a duplicate ID 102, a host name 104 of the document management server 10, and a duplicate shortcut creation date and time 106.

Furthermore, when the duplicate ID is generated, the shortcut provider unit 14 notifies the derivation relationship registration unit 20 of the duplicate ID. The derivation relationship registration unit 20 receives the notification, associates the duplicate ID that is included in the duplicate shortcut request to the derivation relationship information held by the derivation relationship information holding unit 24, and adds the duplicate ID. Furthermore, the shortcut provider unit 14 notifies the history information registration unit 21 of commands for associating the user ID indicating the origin of the duplicate shortcut request, the duplicate ID that was generated in response to the duplicate shortcut request, and the original ID included in the duplicate shortcut request and adding this association to the history information held by the history information holding unit 18. The history information registration unit 21 receives this notification, associates a user ID indicating the request origin, the duplicate ID that was generated in response to the duplicate shortcut request, and the original ID included in the duplicate shortcut request, and registers this into the history information.

The derivation relationship information indicates the derivation relationship of the original ID or the duplicate ID derived from the original ID and each duplicate ID. The derivation relationship information may have a tree structure. As a result, the duplicate ID is associated with the original ID. By referencing the derivation relationship information (following the tree structure if the information has a tree structure), the document management server 10 can identify most original IDs, which the duplicate IDs derive from. FIG. 4 shows one example of a derivation relationship indicated in the derivation relationship information. If the duplicate ID is identified in this manner, the original ID that has been associated with the duplicate ID is identified and in turn the document that has been associated with the duplicate ID is identified. Thus, the original ID and duplicate ID can be used as a document ID to uniquely identify a document.

A document provider unit 16 executes a document provision process. More specifically, when a document read request is received from the client 30, the document provider unit 16 reads the duplicate ID from the document read request and identifies the original ID corresponding to the duplicate ID by referencing the derivation relationship information (to identify the root of the tree structure if the information has a tree structure). Next, the document provider unit 16 reads from the document holding unit 22 the original that has been associated with the identified original ID and copies the document that is included in the original. The document provider unit 16 generates a new duplicate ID in a similar manner to the shortcut provider unit 14 and notifies the derivation relationship registration unit 20 of the duplicate ID. The derivation relationship registration unit 20 receives this notification and registers the duplicate ID into the derivation relationship information so as to be a child of the duplicate ID that is indicated in the document read request. Furthermore, the document provider unit 16 provides a duplicate that includes the document copy and the new duplicate ID to the client 30. The client 30 uses the new duplicate ID that is included in the duplicate and updates the duplicate ID that is included in the duplicate shortcut on the client 30. In addition, the document provider unit 16 notifies the history information registration unit 21 of commands for associating the user ID indicating the origin of the document read request, the duplicate ID that was generated in response to the document read request, and the duplicate ID that is included in the document read request, and adding this association to the history information held by the history information holding unit 18. The history information registration unit 21 receives this notification, associates the user ID indicating the request origin, the duplicate ID that was generated in response to the document read request, and the duplicate ID that is included in the document read request, and registers this association into the history information.

As described hereinabove, the history information registration unit 21 registers into the history information holding unit 18 the history information relating to the respective processes performed by the document registration unit 12, the shortcut provider unit 14, and the document provider unit 16. When the document registration unit 12 executes the document registration process, the history information registration unit 21 registers as history information into the history information holding unit 18 the user ID requesting the document registration, the original ID generated at that time, the creation date and time of the original ID, and so forth. Furthermore, when the shortcut provider unit 14 executes the duplicate shortcut issuance process, the history information registration unit 21 registers as history information into the history information holding unit 18 the user ID requesting the duplicate shortcut, the duplicate ID generated at that time, the creation date and time, and so forth. Moreover, when the document provider unit 16 executes the duplicate provision process, the history information registration unit 21 registers as history information into the history information holding unit 18 the user ID requesting the duplicate (namely, the user ID issuing the document read request), the new duplicate ID for the purpose of updating generated at that time, the duplicate ID that is included in the document read request, the duplicate provision date and time, and so forth.

FIG. 5 shows one example of history information held by the history information holding unit 18. In FIG. 5, an event field 110 indicates the types of processes respectively performed by the document registration unit 12, the shortcut provider unit 14, and the document provider unit 16. The types include "document registration", "SC generation", and "duplicate read". "Document registration" indicates that the document registration unit 12 performed the document registration process. "SC generation" indicates the shortcut provider unit 14 performed the duplicate shortcut issuance process. Furthermore, "duplicate read" indicates the document provider unit 16 performed the document provision process. A request origin field 112 indicates the user ID of the request origin performing a document registration request, duplicate shortcut request or document read request with respect to the document management server 10. A destination field 114 indicates the user ID of the destination when a duplicate shortcut has been transmitted, such as via electronic mail, and will be described later. A new ID field 116 indicates a new original ID or duplicate ID that the document management server 10 generates in response to a request from the client 30. An old ID field 118 indicates a duplicate ID included in the document read request that is transmitted from the client 30. Namely, the old ID field indicates an original ID or duplicate ID to be the parent of the newly generated duplicate ID in the derivation relationship. If the event type is "document registration", a parent original ID or duplicate ID does not exist so that the old ID field 18 is indicated with "-". Furthermore, a date field 120 indicates information on the time when the document management server 10 received a request, such as for document read, from the client 30.

By referencing the old ID field 118 in the history information held by the history information holding unit 18 in this manner, the duplicate ID that was used by the user in the read request can be known. Furthermore, by referencing the history information, the user who issued a request (duplicate shortcut request or read request) in response to which a duplicate shortcut was generated, the user who read a document, and when the document was read can be known.

According to the description hereinabove, when a read request is received from a user in this system, since the document body is not included in the duplicate shortcut, the client 30 must access the document management server 10 to acquire the document body. Then, by referencing the history information held by the history information holding unit 18, the duplicate ID that was used when the user issued the read request can be identified and the user who performed the request (duplicate shortcut request or read request) to which the duplicate ID was generated in response can be identified.

However, in the aforementioned configuration, if the client 30 does not issue a document read request by using a duplicate shortcut, the duplicate ID that is included in the duplicate shortcut is not updated. Thus, when the client 30 transmits the duplicate shortcut to another client, such as via electronic mail, the duplicate ID that is included in the duplicate shortcut is not updated. For this reason, there are instances in the aforementioned configuration where the actual destination of the duplicate shortcut used by the user cannot be identified simply by referencing the history information held by the history information holding unit 18.

Namely, after user A issues a document read request by using a duplicate shortcut, the duplicate shortcut is transferred to user B, such as via electronic mail. User B transfers the duplicate shortcut to user C, such as via electronic mail, without once issuing a document read request using the duplicate shortcut. Thereafter, user B and user C issue document read requests by using duplicate shortcuts they have in their possession. In this case, before transferring the duplicate shortcut, which was transferred from user A, to user C, user B does not even once issue a document read request using the duplicate shortcut. Thus, the duplicate ID that is included in the duplicate shortcut is not updated. Namely, the duplicate ID, which is included in the duplicate shortcut that has been transferred from user A to user B, and the duplicate ID, which is included in the duplicate shortcut that has been transferred from user B to user C, are identical. Thus, by simply referencing the aforementioned history information, it is assumed that the duplicate shortcut held by user B and user C was transferred from user A. However, in actuality, user C had the duplicate shortcut transferred from user B. In this manner, there are instances in the aforementioned configuration where the actual origin of a duplicate shortcut used by a user cannot be identified simply by referencing the history information held by the history information holding unit 18.

Therefore, in this embodiment, in the case where a transfer originating user transfers a duplicate shortcut via electronic mail to a transfer destination user, when the electronic mail is attached with the duplicate shortcut and transmitted with the transfer destination user as the destination, the mail server 40 relaying the electronic mail replaces the duplicate ID that is included in the duplicate shortcut attached to the electronic mail with a new duplicate ID and notifies the document management server 10 of the user ID of the transfer origin, the user ID of the transfer destination, the duplicate ID (before replacement) in the duplicate shortcut attached to the electronic mail transmitted by the user of the transfer origin, and the duplicate ID (after replacement) in the duplicate shortcut attached to the electronic mail received by the user of the transfer destination. The derivation relationship registration unit 20 receives the notification and registers a derivation relationship into the derivation relationship information where the duplicate ID before replacement is the parent and the duplicate ID after replacement is the child. Furthermore, the history information registration unit 21 associates the user ID of the transfer origin, the user ID of the transfer destination, the duplicate ID after replacement, and the duplicate ID before replacement, and adds this association to the history information held by the history information holding unit 18. Namely, the history information registration unit 21 registers the user ID of the transfer origin to the request origin field 112, the user ID of the transfer destination to the destination field 114, the duplicate ID after replacement to the new ID field 116, and the duplicate ID before replacement to the old ID field 118.

Figures 6, 7:
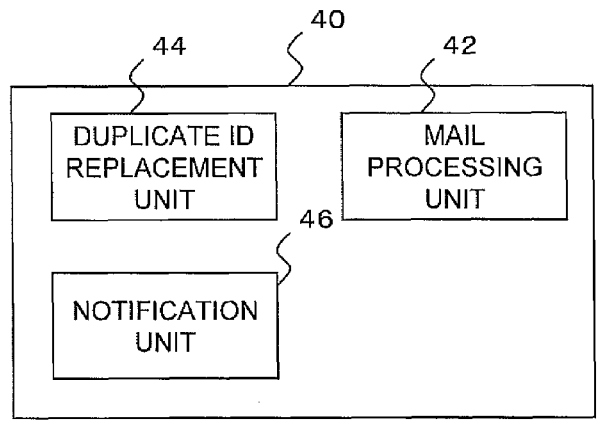
FIG. 6 is a functional block diagram of the mail server.
FIG. 7 shows one example of history information that has been updated by receiving notifications from the mail server.

FIG. 6 is a functional block diagram of the mail server 40 relating to this embodiment. In FIG. 6, a mail processing unit 42 relays electronic mail sent between users. A duplicate ID replacement unit 44 detects whether or not a duplicate shortcut has been attached to electronic mail, and if attached, generates a new duplicate ID and replaces the duplicate ID in the duplicate shortcut with the new duplicate ID.

For example, in the case where the duplicate shortcut has the PDF file format, the duplicate ID replacement unit 44 first judges whether or not a file attachment is present in the electronic mail, and if a file attachment is present, judges whether or not the format of the file is PDF. If the format is PDF, the duplicate ID replacement unit 44 next judges whether or not a duplicate ID is shown in a predetermined location in the file. If, as a result of the judgment, a duplicate ID is shown, the duplicate ID replacement unit 44 generates a new duplicate ID and replaces the duplicate ID shown in the predetermined location. Furthermore, the duplicate ID replacement unit 44 identifies the transfer origin of the duplicate shortcut from the sender shown in the header of the electronic mail and identifies the transfer destination of the duplicate shortcut from the destination shown in the same header.

When the duplicate ID in the duplicate shortcut is replaced by the duplicate ID replacement unit 44, a notification unit 46 notifies the document management server 10 of commands for associating the duplicate ID before replacement in the duplicate shortcut, the duplicate ID after replacement in the duplicate shortcut provided to the destination user, the user ID of the transfer origin identified by the duplicate ID replacement unit 44, and the user ID of the destination identified by the duplicate ID replacement unit 44, and adding this association to the history information. The user ID may be a mail address of a user or another ID that can uniquely identify a user of a preset transfer origin or destination. A user ID is identified from a mail address by storing data associating the user ID with the mail address in advance and referencing the data. Furthermore, a database may be prepared, such as a directory server, to which is registered user data including the mail address and user ID and a search may be performed using LDAP (Lightweight Directory Access Protocol).

FIG. 7 shows one example of history information that has been updated by receiving notifications from the mail server 40. In FIG. 7, "SC transmission" shown in the event field 110 indicates that the duplicate shortcut was transferred by electronic mail between users. Furthermore, in the case where the type of event in the event field 110 is "SC transmission", the user ID of the transfer origin of the duplicate shortcut is shown in the request origin field 112. Moreover, in this case, the user ID of the transfer destination of the duplicate shortcut is shown in the destination field 114. Furthermore, the duplicate ID in the duplicate shortcut of the transfer destination, namely, the duplicate ID after replacement, is shown in the new ID field 116. Additionally, the duplicate ID that was included in the duplicate shortcut of the transfer origin, namely, the duplicate ID before replacement, is shown in the old ID field 118. The date when the document management server 10 received the notification from the mail server 40 is shown in the date field 120.

Thus, in the embodiment, when a duplicate shortcut is transmitted via electronic mail to the destination user, the mail server 40 notifies the document management server 10 of commands to replace the duplicate ID in the duplicate shortcut that is attached to the electronic mail with a new duplicate ID and to update history information to accompany the derivation of the new duplicate ID. The document management server 10 receives the notification and updates the history information.

For example, by referencing a record 132, which is the seventh record from the top of the read history shown in FIG. 7, it can be seen that user C read a document using a duplicate shortcut that includes duplicate ID [4-1]. Then, the duplicate ID [4-1] identifies a record 131 shown in the new ID field 116 so that it can be determined that the duplicate shortcut that includes duplicate ID [4-1] was transmitted to user C via electronic mail, and according to the old ID field 118 in the same record, it can be determined that the duplicate ID at the transmission origin is [3-1]. Then, the duplicate ID [3-1] identifies a record 130 shown in the new ID field 116 so that it can be determined that the duplicate ID was generated due to a request of user B.

Next, a modified example of the embodiment will be described.

According to the aforementioned embodiment, even if a duplicate shortcut that was used when reading a document is transferred via electronic mail, the user sending and the user receiving the duplicate shortcut via electronic mail can be identified by referencing the history information managed by the history information holding unit 18. However, in the aforementioned embodiment, if the duplicate shortcut is transferred to another user by a method other than electronic mail, such as if a recording medium is recorded with the duplicate shortcut and transferred to another user by hand delivery, the duplicate ID in the duplicate shortcut is not replaced and the history information is also not updated. Thus, there are instances where the actual transfer origin of the duplicate shortcut that is used when a user reads a document cannot be identified simply by referencing the history information.

Accordingly, in the modified example of the embodiment, the document management server 10 judges whether or not a duplicate shortcut, which a user used when reading a document, was transferred or provided to that user and only provides a document copy to the user if the duplicate shortcut was transferred or provided to that user.

Figure 8:
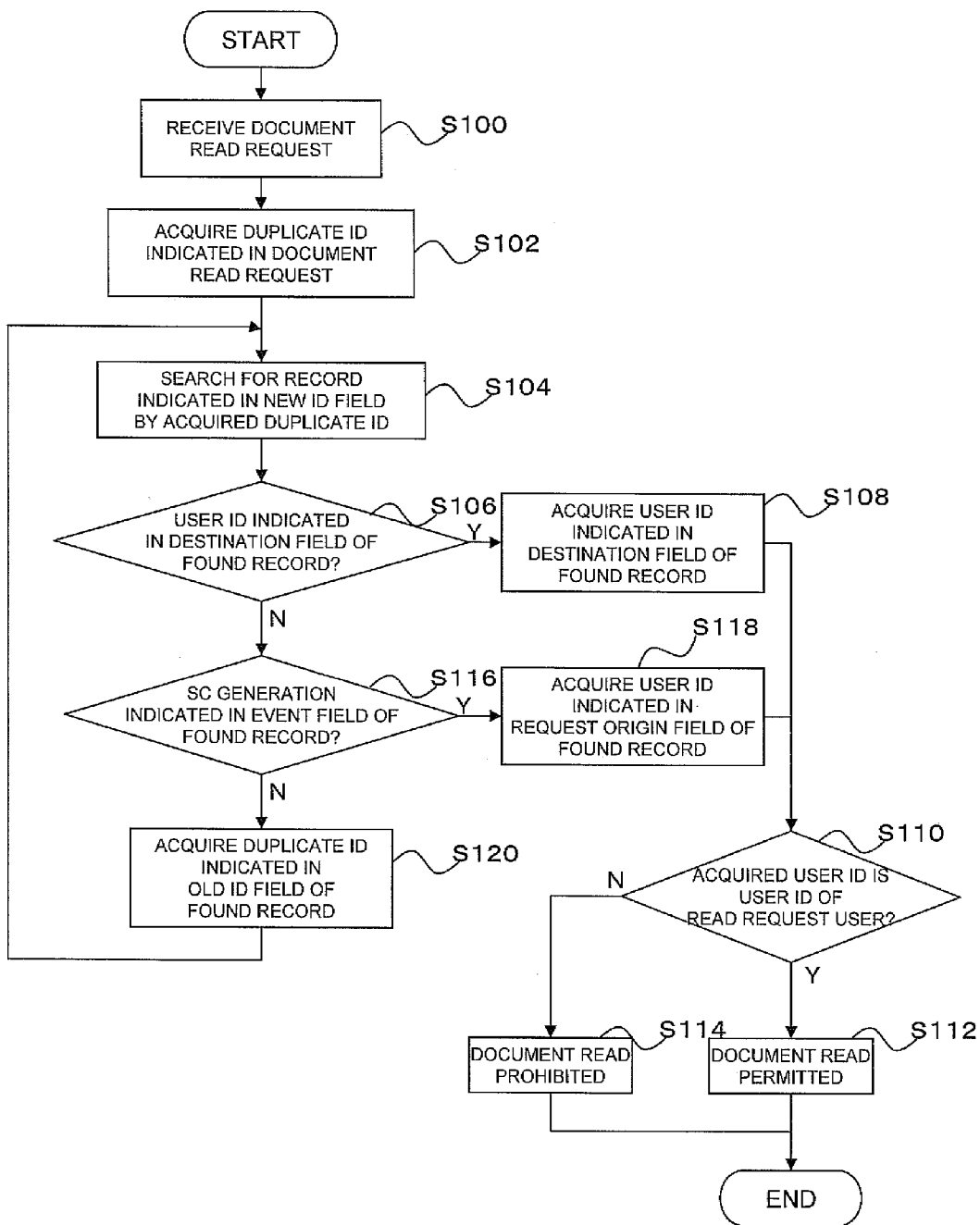
FIG. 8 is a flowchart showing a procedure for performing document provision prior to providing a duplicate document to a client when a document read request is received from the client.

FIG. 8 is a flowchart showing a procedure of this modified example that the document provider unit 16 performs before providing a document copy to the client 30 when a document read request is received from the client 30.

In FIG. 8, when a document read request is received (S100) from the client 30, the document provider unit 16 acquires (S102) a duplicate ID that is indicated in the document read request. Next, the document provider unit 16 searches (S104) for a record in which the duplicate ID is shown in the new ID field 116 by referencing the history information. Furthermore, the document provider unit 16 judges (S106) whether or not a user ID is shown in the destination field 114 of the found record. As a result of the judgment, if a user ID is shown in the destination field 114 (judgment result of step S106 is an affirmative "Y"), the document provider unit 16 acquires (S108) the user ID shown in the destination field 114 of the found record and judges (S110) whether or not the acquired user ID and the user ID of the user who issued the document read request match. As a result of the judgment, if the user IDs match (judgment result of step S110 is an affirmative "Y"), the user who issued the document read request is judged to have issued the request by using the duplicate shortcut that was transferred to that user and the document read operation is permitted (S112). On the other hand, if the user IDs do not match (judgment result of step S110 is a negative "N"), the user who issued the document read request is judged to have issued the request by using a duplicate shortcut that differs from the duplicate shortcut that was transferred to that user and the document read operation is prohibited (S114).

Furthermore, as a judgment result of step S106, if a user ID is not shown in the destination field 114 (judgment result of step S106 is a negative "N"), the document provider unit 16 judges (S116) whether or not "SC generation" is shown in the event field 110 of the found record. As a result of the judgment, if "SC generation" is shown, the user ID shown in the request origin field 112 of the found record is acquired (S118). Thereafter, similar to the aforementioned manner, the document provider unit 16 judges whether or not the acquired user ID matches the user ID of the user who issued the document read request and judges, on the basis of the judgment result, whether or not to permit reading of the document. Namely, the document provider unit 16 permits reading of the document if the user ID of the document read request origin matches the user ID of the intended destination of the duplicate shortcut.

On the other hand, as a result of the judgment of step S116, if "SC generation" is not shown (judgment result of step S116 is a negative "N"), the document provider unit 16 acquires (S120) the duplicate ID shown in the old ID field 118 of the found record and repeats the process from step S104.

Thus, in the modified example, the document provider unit 16 identifies the transfer or provision destination of the duplicate ID by referencing the history information and tracing the derivation relationship of the specified duplicate ID in the document read request and permits access to a document if the identified transfer or provision destination matches the request origin of the document read request. Namely, the document provider unit 16 permits a user to read a document if the user issuing the read request uses a duplicate shortcut that was transferred or provided to that user. Therefore, unless the duplicate shortcut that was transferred or provided to the user is used by the user, reading of the document will not be permitted.

In the aforementioned embodiment and modified example, an example of the mail server 40 replacing the duplicate ID was described when the duplicate shortcut is transferred to another user via electronic mail. However, provided the transfer of the duplicate shortcut between users can be detected, the replacement of the duplicate ID need not be performed by the mail server 40. Namely, the duplicate ID replacement unit 44 and the notification unit 46 may be provided in the document management server 10 or the client 30, or a dedicated computer for duplicate ID replacement may be provided in the document management system.

Furthermore, the embodiment was configured so as to identify the original ID corresponding to the duplicate ID from the derivation relationship information held by the derivation relationship information holding unit 24. However, the embodiment can also be configured so as to identify the original ID by tracing links indicated by the associative relationship of the new ID and old ID in the history information of the history information holding unit 18.

Furthermore, the duplicate ID replacement unit 44 can perform the replacement of the duplicate ID for the duplicate shortcut that is transferred by methods other than electronic mail provided the transfers of the duplicate shortcut between users can be detected. Namely, the duplicate ID replacement unit 44 shown in the embodiment and modified example is applicable even if the duplicate shortcuts are transferred through protocols other than SMTP (Simple Mail Transfer Protocol) and POP (Post Office Protocol), which are used in electronic mail.

Other protocols include HTTP (Hypertext Transfer Protocol), FTP (File Transfer Protocol), and CIFS (Common Internet File System).

In the case of HTTP, the duplicate ID replacement unit 44 replaces the duplicate ID in the message body of the HTTP request or response. Furthermore, the duplicate ID replacement unit 44 identifies the user ID of the request origin or transfer destination by acquiring the mail address shown in the FROM header or the user name that has been encoded using BASE64 in the Authorization header in the HTTP request.

In the case of FTP, clients transferring a file establish two TCP connections. One is a data connection and the other is a control connection. The data connection is for actually sending the data to be transferred and the control connection is for transferring FTP commands and their responses. Thus, the duplicate ID replacement unit 44 acquires and replaces the duplicate ID that is included in the file, which is transferred by the data connection. Furthermore, the duplicate ID replacement unit 44 identifies the user ID of the request origin or transfer destination by referencing the USER command, which is transferred from the client by the control connection.

In the case of CIFS, the duplicate ID replacement unit 44 acquires and replaces the duplicate ID that is included in the Data field in the reply data to the SMB_COM_READ command from the client or the Data field of the SMB_COM_WRITE command that is transmitted from the client. Furthermore, the duplicate ID replacement unit 44 identifies the user ID of the request origin or transfer destination by referencing the data shown in the AccountName field of the SMB_COM_SESSION_SETUP_ANDX command.

Therefore, the duplicate ID replacement unit 44 can detect the duplicate shortcuts transferred between users and perform the replacement of duplicate IDs even for duplicate shortcuts not attached to electronic mail.

The document management server 10, the client 30, and the mail server 40 can each be achieved by installing a program into a computer for implementing the respective process described hereinabove and executing the program. In this case, a central processing unit (CPU) in a microcomputer functions as the various parts, such as the duplicate ID replacement unit 44 and the notification unit 46.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management system comprising:
   a document provider unit that acquires, in response to an access request, a document which is associated to a document ID specified by the access request, from a document storage holding a document which is associated to at least one document ID, generates a new document ID which is associated with the acquired document, and outputs the acquired document and the new document ID to a request origin;
   a history information registration unit that registers associative information on the request origin, the new document ID, and the document ID specified by the access request; and
   a document ID replacement unit that generates, corresponding to transferring of a document ID by a transfer source, a new document ID which is associated with a document corresponding to the document ID to be transferred and replaces the document ID to be transferred with the new document ID, so that the new document ID is transferred to a transfer destination;
   said history information registration unit registering associative information on the transfer source, the new document ID after replacement, the document ID before replacement, and the transfer destination.

2. A document management system according to claim 1, wherein:
the document provider unit searches, in response to an access request to a document, for associative information that includes a document ID specified by the access request as a new document ID after replacement, judges whether or not a transfer destination, if associated to the found associative information, matches origin of the access request, and outputs the document to the request origin if there is a match.

3. A computer readable medium storing a program such that a computer, in response to the program, to executes a predetermined process, the computer is disposed in a document management system that includes a document provider unit which acquires, in response to an access request, a document which is associated to a document ID specified by the access request, from a document storage holding a document which is associated to at least one document ID, generates a new document ID which is associated with the acquired document, and outputs the acquired document and the new document ID to a request origin, and a history information registration unit which registers associative information on the request origin, the new document ID, and the document ID specified by the access request;
the process electronically generating, to correspond to transferring of a document ID by a transfer source, a new document ID to associate with a document corresponding to the document ID to be transferred;
the process electronically replacing the document ID to be transferred with the new document ID, so that the new document ID is transferred to a transfer destination;
the process electronically registering associative information on the transfer source, the new document ID after replacement, the document ID before replacement, and the transfer destination.

4. A computer readable medium storing a program such that a computer, in response to the program, executes a predetermined process, the computer is disposed in a document management system that includes a history information registration unit which registers associative information on a document ID specified by an access request to a document, a new document ID that is generated in response to the access request, and a request origin; and a document ID replacement unit which generates, corresponding to transferring of a document ID by a transfer source, a new document ID to associate with a document corresponding to the document ID to be transferred and replaces the document ID to be transferred with the new document ID, so that the new document ID is transferred to a transfer destination; the history information registration unit registering associative information on the document ID before replacement, the new document ID after replacement, the transfer source, and the transfer destination;
the process electronically, in response to an access request of a document, searching for associative information that includes the document ID specified in the access request as new document ID after replacement;
the process electronically judging whether or not a transfer destination, if associated to the found associative information, matches origin of the access request;
the process electronically, if there is a match, acquiring a document which is associated to the specified document ID from a document storage holding a document which is associated to at least one document ID, generating a new document ID to associate with the acquired document, outputting the acquired document and the new document ID to the request origin, and registering associative information on the specified document ID, the new document ID generated in response to the access request, and the request origin.

5. A document management system comprising:
a document provider unit that acquires, in response to an access request, a document which is associated to a duplicate ID specified by the access request, from a document storage holding a document which is associated to at least one duplicate ID having a derivation relationship with an original ID that uniquely identifies a document, generates a new duplicate ID to be a child of the specified duplicate ID, and outputs the acquired document and the new duplicate ID to a request origin;
a history information registration unit that registers associative information on the request origin, the new duplicate ID, and the duplicate ID specified by the access request; and
a duplicate ID replacement unit that generates, corresponding to transferring of a duplicate ID by a transfer source, a new duplicate ID which is associated with a document corresponding to a duplicate ID to be transferred and is a child of the duplicate ID to be transferred, and replaces the duplicate ID to be transferred with the new duplicate ID, so that the new duplicate ID is transferred to a transfer destination;
said history information registration unit registering associative information on the transfer source, the new duplicate ID after replacement, the duplicate ID before replacement, and the transfer destination.

6. A computer readable medium storing a program such that a computer, in response to the program, executes a predetermined process, the computer is disposed in a document management system that includes a document provider unit which acquires, in response to an access request, a document which is associated to a duplicate ID specified by the access request, from a document storage holding a document which is associated to at least one duplicate ID having a derivation relationship with an original ID that uniquely identifies a document, generates a new duplicate ID to be a child of the specified duplicate ID, and outputs the acquired document and the new duplicate ID to a request origin; and a history information registration unit that registers associative information on the request origin, the new duplicate ID, and the duplicate ID specified by the access request;
the process electronically, in response to transferring of a duplicate ID by a transfer source, generating a new duplicate ID which is associated with a document corresponding to the duplicate ID to be transferred and is a child of the duplicate ID to be transferred;
the process electronically replacing the duplicate ID to be transferred with the new duplicate ID so that the new duplicate ID is transferred to a transfer destination;
the process electronically registering associative information on the transfer source, the new duplicate ID after replacement, the duplicate ID before replacement, and the transfer destination.

7. A computer readable medium storing a program such that a computer, in response to the program, executes a predetermined process, the computer is disposed in a document management system that includes a history information registration unit which registers associative information on a duplicate ID specified by an access request to a document, a new duplicate ID which is generated in response to the access request, and a request origin; a duplicate ID replacement unit which generates, corresponding to transferring of a duplicate ID by a transfer source, a new duplicate ID which is associated with a document corresponding to a duplicate ID to be transferred and is a child of the duplicate ID to be transferred, replaces the duplicate ID to be transferred with the new duplicate ID so that the new duplicate ID is transferred to a transfer destination; the history information registration unit registering associative information on the transfer source, the new duplicate ID after replacement, and the duplicate ID before replacement, and the transfer destination;

the process electronically, in response to an access request of a document, searching for associative information which includes the duplicate ID specified in the access request as new duplicate ID after replacement;

the process electronically judging whether or not a transfer destination, if associated to the found associative information, matches an origin of the access request;

the process electronically, if there is a match, acquiring a document which is associated to the specified duplicate ID from a document storage holding a document which is associated to at least one duplicate ID having a derivation relationship with an original ID that uniquely identifies a document, generating a new duplicate ID which is associated with a document corresponding to the specified duplicate ID, outputting the acquired document and the new duplicate ID to the request origin, and registering associative information on the specified duplicate ID, the new duplicate ID generated in response to the access request, and the request origin.

\* \* \* \* \*